J. A. WOODS, Jr.
FRUIT GRADER.
APPLICATION FILED MAR. 22, 1912.
1,038,056.
Patented Sept. 10, 1912.
2 SHEETS—SHEET 1.
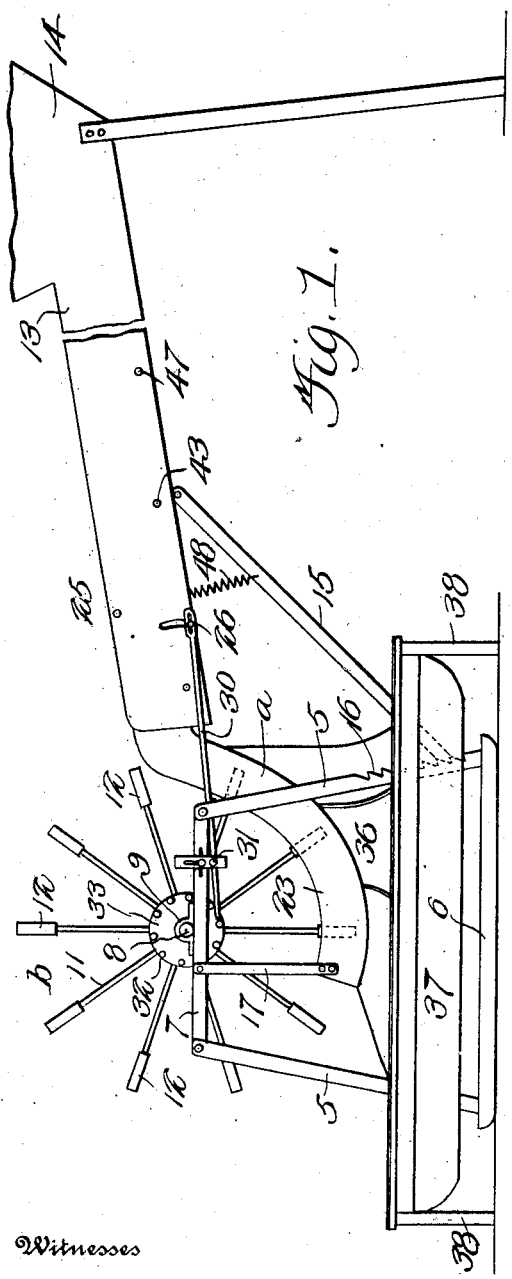
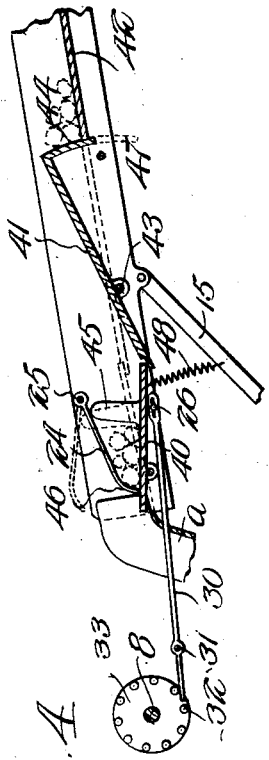
Witnesses
Hugh Ott
John A. Donegan
Inventor
James A. Woods Jr.
By Victor J. Evans
Attorney J. A. WOODS, Jr.
FRUIT GRADER.
APPLICATION FILED MAR. 22, 1912.
1,038,056.
Patented Sept. 10, 1912.
2 SHEETS—SHEET 2.
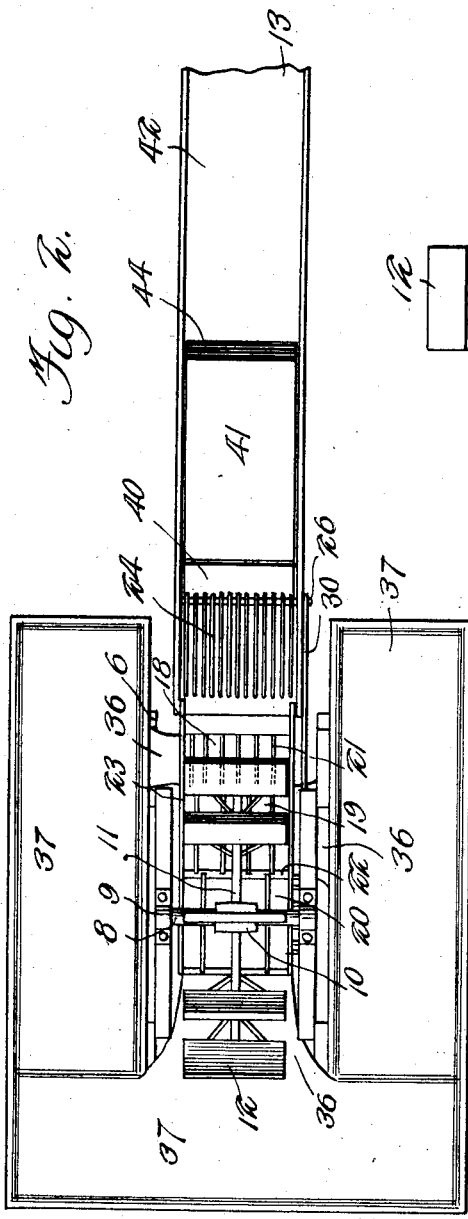
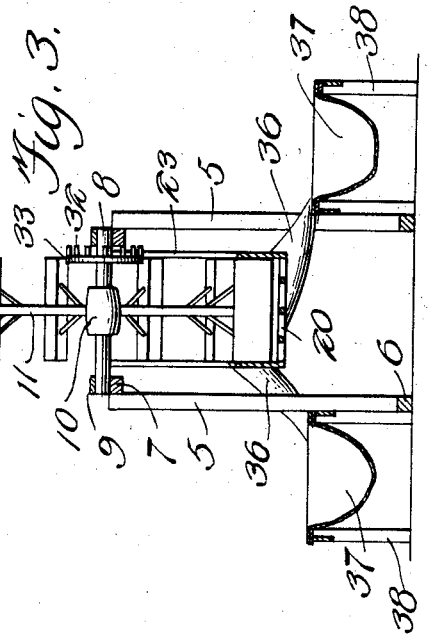
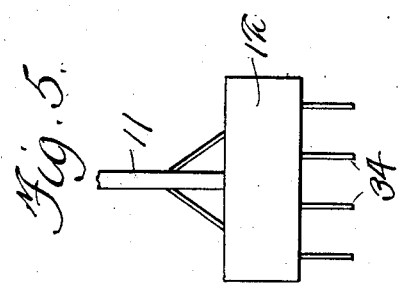
Witnesses
Inventor
James A. Woods, Jr.
By Victor J. Evans
Attorney

UNITED STATES PATENT OFFICE.

JAMES A. WOODS, JR., OF OGDEN, UTAH.

FRUIT-GRADER.

1,038,056.  Specification of Letters Patent.  Patented Sept. 10, 1912.

Application filed March 22, 1912. Serial No. 685,434.

*To all whom it may concern:*

Be it known that I, JAMES A. WOODS, Jr., a citizen of the United States, residing at Ogden, in the county of Weber and State of Utah, have invented new and useful Improvements in Fruit-Graders, of which the following is a specification.

The general object of the invention is to provide means for grading fruit and to enable the fruit to be graded to operate the grading devices; and to this end the invention consists in certain improved constructions, arrangements, and combinations of devices, which will be fully described hereinafter, and then pointed out in the claims.

Other objects will appear and be better understood from that embodiment of my invention of which the following is a specification, reference being had to the accompanying drawings forming a part hereof, in which;

Figure 1 is a side elevation of the device. Fig. 2 is a plan. Fig. 3 is a detail vertical cross section taken through the grading element, also showing the upper portions of the grading tables. Fig. 4 is a detail perspective of the feed controlling mechanism. Fig. 5 is a detail elevation of a modified form of retarder arm.

The device as illustrated is portable and if desired, may be taken into a fruit orchard and placed upon the ground and operated by the fruit introduced or fed thereto. It will, of course, be understood that it is immaterial as to where the device is placed; that is to say, it may be arranged in a fruit store house, or any other place where it is found most desirable to grade fruit according to size.

The legs 5 are adjustably secured to the skids 6 which constitute the base so that the frame 7 which is arranged at the upper ends of the legs 5 may be adjusted into a horizontal position regardless of the slope or unevenness of the ground upon which the skids bear. The shaft 8 which is journaled in boxings 9 on the frame 7 has mounted upon it a hub 10 to which is fixed the inner ends of the radial arms 11 whose outer ends have suitably secured thereto, the cross pieces 12. The shaft with the parts thus connected thereto constitutes a retarder.

The fruit is introduced into a hopper 14 which connects with an inclined conveyer 13 whose inclination may be varied by adjusting the struts 15 on the racks 16 carried by certain of the supporting legs 5; and from the conveyer 13 the fruit moves by gravity into grading element $a$ which is herein shown as quadrantal in contour and extending from one end of the conveyer 13 around a portion of the retarder $b$. The hangers 17—17 connect the grading element with suitable portions of the frame and hold it in the position shown. The passages 18 for the small size fruit are located nearest the discharge end of the conveyer 13 and to one end of the passages 19 for the medium size fruit, and the passages 20 for the large size fruit are located at one end of the passages 19. The partitions 21 between the various passages are adjustably secured to cross pieces 22 connected to the opposite sides 23—23 of the grader $a$ so that the sizes of the various passages may be varied according to the character of the fruit to be graded. The upper edges of these partitions 21 also serve as tracks or bearings for the fruit as it passes through the grader $a$ and the said upper edges are positioned sufficiently far below the upper edges of the side walls 23—23 so as to enable the latter to act as ledges and prevent the fruit from moving laterally off the grader $a$. The said upper edges are also so positioned that during the rotation of the retarder they will be wiped by the cross pieces 12 thereof.

The discharge end portion of the conveyer is made up of the sections 40, 41 and 42 which are arranged between the side walls of the conveyer. The section 42 is stationary while the section 41 is pivoted, the pivot 43 passing through a portion beyond the middle of the said section so that the said section will be overbalanced. The section 40 is pivoted between the sides of the conveyer and inclines downwardly from the section 41, which is held downwardly inclined by one end of the section 40 bearing thereon. The inclination of the section 41 is such as to throw its higher end above the plane of the section 42 so that a depending apron 44 carried by the elevated end of the said section which is also the heavier end, will form a stop for the fruit which is on the section 42.

When a lever 30 connected to an adjustable fulcrum 31 on the frame 7, is depressed by one of the pins 32 projecting laterally from the disk 33 fixed to the shaft 8, the said lever, which has a pin and slot connection 26 with the section 40, elevates that end of the said section 40 to which it is connected. The upward movement of the said end of the said section will continue until the pin 32 clears the lever. During the upward movement of the said end of the said section, a rib 45 thereon moves into contact with a gate 24. The gate 24 is pivoted to a cross bar 25 and inclines downwardly to the section 40. The gate is made up of prongs the lower end portions of which are curved, as shown at 46, and bear on the section 40 and thus prevent the fruit thereon from moving onto the grader. After the rib 45 contacts with the gate 24 the end of the section to which the rib is connected, is moved a trifle farther so that the rib eventually lifts the gate and thus the fruit rolls from the section 40 onto the grader. During the upward movement of the said end of the section 40 the adjacent end of the section 41 follows until the opposite end of the said section 41 moves below the section 42 for a short distance and abuts the stop 47. A quantity of fruit from the section 42 will then move onto the section 41. When the pin 32 clears the lever 30 the section 40 which is also overbalanced, will descend by gravity and into contact with one end of the section 41. A spring such as shown at 48, aids the section 40 to descend and to rock the section 41. This rocking of the section 41 causes the fruit to move therefrom onto the section 40 and at the same time brings the apron 44 into position to check the movement of the fruit on the section 42. The whole number of pins 32 corresponds to the number of arms 11 and are so arranged that during the rotation of the retarder the pins will abut the free end of the lever a trifle before the cross pieces 12 pass into the upper end of the grader $a$. But by the time the gate has been raised sufficiently far to permit the fruit to pass thereunder, the retarder will have turned sufficiently to enable one of the cross pieces 12 to block the upper end of the grader so that the fruit released by the gate will strike the said cross piece, and the fruit by its weight on the cross piece, will have the effect of further turning the retarder until the pin which depressed the lever 30 clears the same, whereupon the gate will close under the action of its spring and cut off the supply of fruit to the grader. Now, if we assume that the first lot of fruit released by the gate was made up of different size units, it will be evident that the smallest of these will fall through the passages 18 as the retarder is turned by the fruit, while the next in size will fall through the passages 19 and finally the largest will fall through the passages 20. By the time that the smallest fruit has been discharged through the passages 22 the pin succeeding that which first operated the gate, will have caused the latter to reopen so that a second quantity of fruit will be released from the conveyer by the time that the first quantity has moved the retarder a trifle beyond the passages 18. This second quantity of fruit will assist the remnants of the first discharged quantity to turn the retarder until the largest pieces of the first quantity fall through the passages 20. By this time, however, a third quantity of fruit will have been released from the conveyer and moving into the upper open end of the grader. Thus, it will be seen that the action will be continuous as long as fruit is fed from the hopper to the conveyer 13.

By properly adjusting the tension of the spring 48 the rotor of the retarder $b$ may be made to turn relatively slow after any of the pins 32 engage the lever 30. This will give ample time to the fruit moving through the grader, to enter the passages thereof. By adjusting the fulcrum 31 the throw or opening movement of the gate may be varied so that a predetermined quantity of fruit will be released each time the gate is opened. The slats or prongs 34 of the gate are resilient so that during the closing of the gate, if the end of one of these elements should contact with a piece of fruit it will yield so that the closing of the gate will not be interrupted.

The modified form of retarder shown in Fig. 5 is to be used when grading irregular-shaped fruit, the prongs 34 on this element being adapted to enter the fruit passages and to remove therefrom any fruit which might become wedged therein.

From the fruit passages 18, 19 and 20 the fruit is conveyed by the chutes 36 to the grade tables 37 which are supported by the legs 38 which are adjustable so as to admit of the table being arranged in a horizontal plane when positioned upon an uneven surface.

What I claim as new is:

1. In a fruit grader, the combination of an inclined grading element having a plurality of laterally adjustable fruit passages, a conveyer for introducing fruit into the upper end portion of the grading element, and means operated by the fruit for retarding the movement of the same on the grading element until it enters the fruit passages thereof.

2. A fruit grader comprising an inclined grading element, a conveyer adapted to discharge into the upper end of the grading element, means for controlling the passage of the fruit from the conveyer to the grader, and rotary means for operating the controller and actuated to do so by the fruit in the grader.

3. In a fruit grader, the combination with an inclined grading element and a conveyer adapted to discharge into the upper end of said grading element; of rotary means operated by the fruit in the grading element for controlling the passage of the fruit from the conveyer into the grader.

4. In a fruit grader, the combination with an inclined grading element and a conveyer adapted to discharge into the upper end of said grading element; of means for controlling the discharge of fruit from the conveyer into the grader, and adjustable means for intermittently operating the controller and actuated to do so by the fruit in the grader.

5. In a fruit grader, the combination of an inclined grading element, a conveyer adapted to discharge into the upper end of the grading element, and rotary means operated by the fruit in the grading element for intermittently operating the controller and retarding the movement of the fruit through the grading element.

In testimony whereof I affix my signature in presence of two witnesses.

JAMES A. WOODS, Jr.

Witnesses:
T. B. WHEELWRIGHT,
FRANCIS L. WOODS.

Copies of this patent may be obtained for five cents each, by addressing the "Commissioner of Patents, Washington, D. C."